(12) United States Patent
Barkhausen et al.

(10) Patent No.: US 8,497,448 B2
(45) Date of Patent: Jul. 30, 2013

(54) APPARATUS AND METHOD FOR WORKING A SURFACE OF A WORKPIECE BY MEANS OF LASER RADIATION

(75) Inventors: Winfried Barkhausen, Aachen (DE); Edwin Buechter, Herzogenrath (DE)

(73) Assignee: Clean Lasersysteme GmbH, Herzogenrath (DE)

( * ) Notice: Subject to any disclaimer, the term of this patent is extended or adjusted under 35 U.S.C. 154(b) by 640 days.

(21) Appl. No.: 12/451,259

(22) PCT Filed: Apr. 29, 2008

(86) PCT No.: PCT/EP2008/055237
§ 371 (c)(1),
(2), (4) Date: Feb. 16, 2010

(87) PCT Pub. No.: WO2008/135455
PCT Pub. Date: Nov. 13, 2008

(65) Prior Publication Data
US 2011/0049114 A1    Mar. 3, 2011

(30) Foreign Application Priority Data

May 3, 2007 (DE) .......................... 10 2007 020 748

(51) Int. Cl.
*B23K 26/067* (2006.01)
*B23K 26/06* (2006.01)
*B23K 26/36* (2006.01)

(52) U.S. Cl.
USPC ............. 219/121.65; 219/121.66; 219/121.77

(58) Field of Classification Search
USPC ............. 219/121.61–121.72, 121.77, 121.82, 219/121.83, 121.85
See application file for complete search history.

(56) References Cited

U.S. PATENT DOCUMENTS

| | | | | |
|---|---|---|---|---|
| 4,539,462 A | * | 9/1985 | Plankenhorn | ............ 219/121.79 |
| 4,694,136 A | * | 9/1987 | Kasner et al. | ............ 219/121.64 |

(Continued)

FOREIGN PATENT DOCUMENTS

| | | |
|---|---|---|
| DE | 197 07 834 A1 | 10/1997 |
| DE | 694 10 900 T2 | 2/1999 |

(Continued)

OTHER PUBLICATIONS

Boehm et al., "Laser based surface treatment of aluminum alloys for adhesive bonding," ICEPAM 2004, Jun. 18, 2004, retrieved from Internet at http://www.sintef.no/static/mt/norlight/ICEPAM/24-Bohm_Braunschweig.pdf.

*Primary Examiner* — Samuel M Heinrich
(74) *Attorney, Agent, or Firm* — Kriegsman & Kriegsman (57) ABSTRACT

The present invention, among other things, relates to an apparatus (10) for working a surface (11) of a workpiece, in particular a metal workpiece, by means of laser radiation. The apparatus (10) is characterized by a scanner device (20), which is mounted in a rotationally immovable manner in the working apparatus (10) and is intended for shaping a laser beam that is to be deflected and positioned onto the surface to be worked, a control device for changing the orientation of the scanning direction of the laser beam shaped in the scanner device (20), and an optics element (40), which is movable about an axis of rotation (12), is arranged downstream of the scanner device (20) in the beaming direction of the laser beam and advantageously has a beam splitter device for splitting the laser beam into two or more beam parts (41, 42) and for deflecting and positioning the beam parts (41, 42) onto the surface (11) that is to be worked. A method for working a surface of a workpiece by means of laser radiation is also described.

15 Claims, 10 Drawing Sheets

U.S. PATENT DOCUMENTS

| | | | |
|---|---|---|---|
| 4,710,606 A | * 12/1987 | Soroka et al. | 219/121.78 |
| 5,321,224 A | * 6/1994 | Kamimura et al. | 219/76.15 |
| 5,601,737 A | 2/1997 | Asahi et al. | |
| 6,621,046 B2 | * 9/2003 | Kaji | 219/121.72 |
| 6,696,667 B1 | 2/2004 | Flanagan | |
| 7,842,901 B2 | 11/2010 | Wawers et al. | |

FOREIGN PATENT DOCUMENTS

| | | |
|---|---|---|
| DE | 199 51 563 A1 | 5/2001 |
| DE | 102 28 743 A1 | 1/2004 |
| DE | 10 2004 059 260 A1 | 3/2006 |
| DE | 10 2005 047 328 B3 | 12/2006 |
| EP | 0 927 595 B1 | 4/2002 |
| EP | 1 542 813 B1 | 6/2006 |
| GB | 2 215 859 A | 9/1989 |
| JP | 56045293 A * | 4/1981 |
| WO | WO 2005/122694 A2 | 12/2005 |

* cited by examiner

APPARATUS AND METHOD FOR WORKING A SURFACE OF A WORKPIECE BY MEANS OF LASER RADIATION

The present invention first of all relates to an apparatus for working a surface of a workpiece, in particular a metal workpiece, by means of laser radiation, as well as a laser working assembly for working a workpiece by means of laser radiation. In addition, the invention also relates to a method for working a surface of a workpiece, in particular a metal workpiece, by means of laser radiation.

In recent years, the range of possibilities for working workpieces by means of laser radiation has become increasingly larger. Lasers are particularly used in a plurality of ways in order to work surfaces of workpieces. For example, a method is known from DE 10 2004 059 260 A1, in which the layer of a metal workpiece lying near the surface is melted with the use of laser radiation and is subsequently cooled again. Structural changes occur thereby, which, for example, as a consequence, brings about improved mechanical properties of the surface of the workpiece. A similar method is known from DE 102 28 743 B4, by means of which, the surfaces of a workpiece can be smoothed and polished. In order to achieve this, in particular, pulsed lasers are utilized. Likewise, it is already known to clean surfaces by means of laser radiation. In this way, contaminants found on the surface are removed, for example, by melting, vaporizing or blasting off.

Since the laser light generated by a laser source can impinge on the surface of a workpiece to be worked, laser working assemblies are used, which are also known in a plurality of solutions in the prior art. Usually, in addition to a laser source for producing a laser beam, laser working assemblies also provide a working apparatus for the targeted deflecting and positioning of the laser beam on the workpiece to be worked. These working apparatuses can be embodied in different ways, depending on the field of application.

For example, a laser working assembly is described in DE 197 07 834 A1, by means of which a laser beam can be split into two or more beam parts with the use of a beam splitter. With the known solution, it is particularly provided to position similar systems one behind the other, which then can be operated in parallel simultaneously.

Of course, with the known solution, it is only possible to work simple planar surfaces. Complicated geometries, such as grooves or the like, for example, or even a curvature or a change in the running direction of the working apparatus has previously not been possible without problems. Likewise, it has not been possible up to now with the known solutions to carry out every type of surface working. This is particularly true relative to a pretreatment of adherends.

The object of the present invention is to provide an apparatus as well as a method for working a surface of a workpiece by means of laser radiation, with which the named disadvantages can be avoided. In particular, it shall be made possible to pretreat metal surfaces that are to function as adherends in a suitable way, whereby complicated geometries will also be worked simultaneously.

This object will be achieved according to the invention by the working apparatus with the features according to the independent patent claim 1, the laser working assembly with the features according to the independent patent claim 9, the method with the features according to the independent patent claim 13, as well as the special use according to the independent patent claim 15. Additional features and details of the invention can be derived from the subclaims, the description and the drawings. Features and details that are described in connection with the working apparatus according to the invention thus also apply, of course, in connection with the laser working assembly according to the invention, and vice versa. Likewise, features and details that are described in connection with the method according to the invention also apply, of course, in connection with the working apparatus and/or the laser working assembly, and vice versa in each case. The same applies to the use according to the invention.

According to the first aspect of the invention, an apparatus for the working of a surface of a workpiece, in particular, a metal workpiece, will be provided, the working being conducted by means of laser radiation. According to the invention, the working apparatus is characterized by a scanner device mounted in a rotationally immovable manner in the working apparatus, as well as an optics element movable around an axis of rotation, by means of which a laser beam that is to be deflected and positioned on the surface to be worked can be shaped with a defined laser beam geometry, the optics element of the scanner device being arranged downstream in the beaming direction of the laser beam. In addition, a control device is provided for changing the orientation of the scanning direction for the beam deflection of the laser beam in correspondence with the rotation of the optics element.

The working apparatus according to the invention is composed of different basic components. It involves a scanner device and an optics element. These have the function of shaping a laser beam that is to be deflected and positioned on the surface to be worked. The scanner device serves for deflecting the beam of the laser beam. The optics element serves for deflecting the beam and for focussing the laser beam. The laser beam will be deflected by the scanner device primarily onto the surface to be worked. The optics element serves primarily for deflecting the beam and for further positioning the laser beam on the surface to be worked. The laser beam made available for the working of the workpiece will be shaped by both basic components, this beam having a defined laser beam geometry according to the invention. Both basic components are responsible for the actual positioning of the laser beam on the surface to be worked, but the scanner device is stationary and the optics element can be rotated. The scanner device is connected to different structural elements, such as, for example, a laser source, a control unit or the like, for the operation of the scanner device. This connection will usually be effected via cables, conductors, for example, mirrors or light guides, and the like. If the working apparatus follows contours and thus also will change its running direction, the scanner device actually must also rotate therewith, so that the shaped laser beam, which can impinge, for example, linearly on the surface to be worked, also remains linear and in the same alignment when there is a change in the running direction. This is, however, a great disadvantage, since the above-named connections could be disrupted thereby, for example, by twisting cable or conductor packets. In order to circumvent this disadvantage, it is first provided according to the invention that the scanner device is mounted in a rotationally immovable manner in the working apparatus. This means that the scanner device cannot be turned or rotated within the working apparatus, so that the positioning of the scanner device cannot change relative to the working apparatus when a rotational movement is to be conducted. The scanner device therefore cannot be turned or rotated by itself alone, independently of the working apparatus. Of course, it would be conceivable that the scanner device can be moved laterally. It is only important that a rotational movement and thus rotation of the scanner device will be avoided; if it is not, such rotation could lead to the above-described disadvantageous twisting of the cable or conductor packets.

Of course, the position of the scanner device can be changed with respect to the workpiece surface. This is only possible, however, if the position of the entire working apparatus is changed. For example, the working apparatus can be mounted on a working guide, which will proceed in a suitable way in the longitudinal direction and/or crosswise direction to the workpiece surface. In this way, the working guide can advantageously, but not necessarily, be configured in such a way that it cannot by itself execute any rotation.

Now, however, in order to achieve a subsequent guiding of the shaped laser beam, for example, if curves are to be followed on the surface of the workpiece and a change in the running direction of the working apparatus occurs, it is first provided according to the invention that the orientation of the scanning direction of the beam deflection of the laser beam can be changed. This will be effected by means of a control device. Now, if a curve-shaped course is to be followed, the scanner device itself will not be rotated, but rather only the orientation of the scanning direction of the laser beam. This is particularly achieved by changing the deflection path of the shaped laser beam, for example, by changing the position of the mirrors present in the scanner device. This can be performed advantageously by suitable programming means, which run on the control device and preferably are implemented in this device.

Finally, the working apparatus according to the invention also has an optics element movable around an axis of rotation. Rotations necessary for curved travel will thus be carried out only by the rotatable optics element. This optics element is first of all characterized in that it is downstream from the scanner device in the beaming direction of the laser beam. In addition, the optics element provides means for deflecting and positioning the laser beam on the surface to be worked. The invention is not limited to specific embodiments for the optics element. Several advantageous but nonexclusive examples will be explained in more detail for this purpose in the following text. The optics element may advantageously involve a rotating optics with mirror deflection. The means to be used may involve, for example, special mirrors or mirror systems. For example, a beam splitter device is also conceivable for splitting the laser beam into two or more beam parts and for deflecting and positioning the beam parts on the surface to be worked.

It is now provided according to the invention that the orientation of the scanning direction for the beam deflection of the laser beam is made in correspondence with the rotation of the optics element. This means that the change in the orientation of the scanning direction and the rotation of the optics element lie in a defined ratio to one another. This can be achieved, for example by combining or coupling them with one another. This defined ratio can influence the speed of beam deflection, the breadth of beam deflection and the geometry of beam deflection for the laser beam, in particular, when the laser beam is to follow the contour/course of the surface to be worked.

On the one hand, it is possible to work more complex contours by means of laser radiation via the working apparatus according to the invention. It is possible, in particular, that the working apparatus changes running direction during one working step; travel along a curve will also be particularly possible. Thus a possibility is created by the working apparatus according to the invention as to how the laser beam can follow in a particularly advantageous way the contour/course of a surface to be worked.

The scanner device is stationary in the working apparatus according to the invention. Only the optics element can rotate, whereby preferably rotation is effected about the outlet axis of the scanner device. Now, if the working apparatus is to follow a curve, on the one hand, the optics element rotates, and thus the laser beam or beams that are irradiated by it also rotate(s) on the surface of the workpiece. Additionally, the orientation of the laser beam shaped in the scanner device rotates, so that the working parameters—in particular, the orientation of the beam deflection referred to the working contour—do not change and continually remain the same both during the curved travel as well as after curved travel has been completed.

This type of working apparatus can be utilized for the most varied applications. It is possible, in a particularly advantageous manner, to clean joint edges of housing parts by means of laser with the working apparatus and thus a bonding process can subsequently be conducted therewith. These types of component parts usually involve a circulatory adherend, which is embodied partially as a type of "groove" and partially as a type of "crosspiece" or "tongue". Cleaning must then be carried out on both flanks of the groove or crosspiece and also at the base of the groove or the groove burrs. This is now made possible without problem by the working apparatus according to the invention. The working apparatus according to the invention is thus suitable in a special way for the laser working of adherends.

By adjusting suitable method parameters, over and above this, it is also possible to obtain a desired improvement of the adhesive strength of the worked surface. This will be achieved, in particular, by the circumstance that the aging stability of the worked surface, for example, an aluminum surface, will be improved by bringing about a complete remelting of the layer near the surface by means of the laser beam with its suitable parameters.

We will describe this further in greater detail below in connection with the method according to the invention, so that reference is made here to the full content of the corresponding statements.

In this case, the invention is basically not limited to specific materials that can be worked. Metal components, however, can be worked especially advantageously, in particular, components of aluminum or with aluminum surfaces, components of magnesium or with magnesium surfaces, components of light metals in general, or the like.

The present invention is also not limited to the working of specific geometries. Advantageously, it involves worked surfaces around regions formed as grooves, tongues, crosspieces, and the like. Of course, simple contoured surfaces, flat surfaces, tubular products are also workable inside and outside, such as the insides of molds and the like. Working can thus be conducted horizontally and/or vertically.

The working apparatus according to the invention may also be described as follows. Accordingly, an apparatus will be provided for the working of a surface of a workpiece, in particular, a metal workpiece, the working being conducted by means of laser radiation. According to the invention, the working apparatus is characterized by a scanner device, which is mounted in a rotationally immovable manner in the working apparatus, for shaping laser beam to be deflected and positioned on the surface to be worked, a control device for changing the orientation of the scanning direction of the laser beam formed in the scanner device, and an optics element movable around an axis of rotation, which optics element is disposed downstream of the scanner device in the beaming direction of the laser beam and which has means for deflecting and positioning the laser beam on the surface to be treated.

Basically, it is sufficient for the present invention if a single laser beam is formed, which, as a whole, impinges on the surface to be worked. Advantageously, of course, it can also be provided that the optics element has a beam splitter device which is designed for splitting the laser beam into two or more beam parts and for deflecting and positioning the beam parts on the surface to be worked. Advantageously, the beam splitter device may have two or more deflecting elements. Advantageously, at least one deflecting element can be embodied as a partially transparent deflecting element. Advantageously, in addition, at least one deflecting element can be embodied as a deflecting element that deflects completely.

This shall be explained on the basis of working a surface formed as a crosspiece, and both flanks of the crosspiece shall be worked. On the one hand, it is possible that the working apparatus makes two revolutions, one flank of the crosspiece being worked during each revolution. In this case, it is sufficient if only a single laser beam is made available. If, for example, only one revolution is to be carried out, it is advantageous to split the laser beam into two beam parts, each beam part being directed onto one of the crosspiece flanks, so that both flanks can be worked simultaneously. In this case, care should be taken that the beam parts provide the necessary intensity each time.

In another embodiment, it is advantageously provided that the beam splitter device is designed for splitting the laser beam into two beam parts of the same intensity. If, for example, a groove-shaped, tongue-shaped or crosspiece-shaped surface is to be worked, it will be assured in such a case that each side of the flank or each wall will be swept over by one beam part and that a uniform working can occur, since the two beam parts have the same intensity. Of course, it is also possible that the beam parts will be generated with different intensities. This is particularly advantageous if the beam parts will be applied onto the surface at different angles of the individual beams. Due to the different angles of the individual beams and the different focus diameters onto the surface that are associated therewith, an identical intensity results in turn on the surfaces to be worked, for example, the tongue and groove surfaces, due to the asymmetrically matched intensities for the split beam parts—taking into consideration the different angles of the individual beams.

It is advantageously provided that the working apparatus has a motor system for moving the optics element. Here, the invention is not limited to specific motor constructions. It can be provided advantageously that the motor system has a stator. The scanner device preferably can be attached to this stator, so that the latter is rigidly disposed and thus immovable in the working apparatus. In addition, in such a case, the motor system also provides a rotor which is joined with the optics element. When the motor system is actuated, the optics element can then be rotated, whereas the scanner device remains in a fixed position. The motor system can be advantageously designed according to the so-named "inside-rotor" principle, which means that the rotor is on the inside and the stator is on the outside.

A very favorable construction of the working apparatus can be attained by the use of such a motor system. In this case, the individual components can be aligned along a common axis. It may be provided, for example, that first the scanner device, which is disposed, for example, flange-mounted on the stator of the subsequent motor system, is provided in the beaming direction of the laser beam. Then the optics element, which is disposed, for example, flange-mounted on the rotor and is thus rotatable, is provided subsequently arranged downstream, and thus on the other side of the motor system. In such a case, the motor system must be designed so that the laser beam can be guided from the scanner device through the motor system so as to reach the optics element.

The scanner device preferably has at least one connection to at least one laser source. The laser light can then be guided from a laser source to the scanner device via a corresponding conductor, which is joined with the scanner device by means of the connection, and subsequently the light can be shaped into the desired laser beam in this scanner device.

Therefore, since the beam parts that are generated in the optics element can also be directed onto the surface of the workpiece, it is advantageously provided that the optics element has radiating heads set at a distance from one another for beaming and positioning the beam parts on the workpiece surface. If two beam parts are to be generated, two such radiating heads are advantageously provided. It may be provided, for example, that the radiating heads are disposed on corresponding arms. Of course, other variants of embodiment are also conceivable, for example, a surrounding circular contour on which the radiating heads are disposed in the desired number.

In the case of two or more beam parts, their focus positions relative to the point of intersection of the individual beams can preferably be varied. For this purpose, it is advantageously provided that the focus position of the beam parts relative to the point of intersection of the individual beams can be variably adjusted. In this case, the working apparatus preferably has means—optical means, in particular—for the variable adjustment of the focus position of the individual beam parts relative to the point of intersection of the beam parts. The means can be actuated, for example, via a suitable control device, i.e., a control device as mentioned either above or later on. In this case, the focus position will be the site of highest intensity or the site of the point of minimum beam expansion. It may be provided, for example, that the focus position is set at the point of intersection of the individual beam parts. Depending on the application in each case, however, it may also be advantageous if the focus position is found slightly in front of or slightly behind the point of intersection of the individual beams. This shall be illustrated on the basis of several examples. Usually the appropriate adjustment is made depending on how the component is formed or configured in the region of the surface to be worked. For example, if a crosspiece is to be worked, it is advantageous if the focus position of the two beam parts is found in front of the point of intersection of the two individual beams. For example, if a groove is to be worked, it is advantageous if the focus position is found behind the point of intersection of the individual beams. Of course, there are also applications in which it is advantageous if the focus position is found at the point of intersection of the individual beams. The focus position is preferably set, or the focus position can be set in such a way that the focus is found directly on the surface to be worked, i.e., on a component surface.

If, for example, as described further above, a component crosspiece formed on a surface of the component is to be worked, the point of intersection of the two beam parts is found inside the component. That is, inside the crosspiece. If, for example, a groove which is formed in a surface of the component is to be worked, the point of intersection of the two beam parts will be found outside the component. Due to the variable adjustment of the focus position relative to the point of intersection of the beam parts, it can be assured that the site of highest intensity, i.e., the focus position, can always be adjusted onto the surface to be worked, for example, onto the walls of the crosspiece or the groove.

In another embodiment, it can advantageously be provided that the point of intersection of the individual beam parts lies on or in the axis of rotation of the optics element. For this purpose, it is preferably provided that the beam parts are aligned in such a way that their point of intersection lies in or on the axis of rotation of the optics element. Advantageously, in such a case, the working apparatus has an optics element with a beam splitter device, which is designed for splitting the laser beam into two or more beam parts, whose point of intersection lies on or in the axis of rotation or rotational axis of the optics element.

The optics element can be advantageously designed for the centric or non-centric superimposing of the beam parts. In the case of two or more beam parts, it is advantageous to superimpose these on a common working point. In this way, both sides or flanks of a groove or of a crosspiece can be worked in a single working step, for which reason the time necessary for the working can be significantly shortened. In the case of a centric superimposition—referred to the axis of rotation—of the beam parts, the optics for working will be guided centrally by the working guide over the contour to be worked, such as straight or curved pieces, for example. A non-centric superimposition—referred to the axis of rotation—of the beam parts is also possible, whereby preferably the displacement of the incident point corresponds to the radius of the curved pieces to be worked. By means of this embodiment, the working is simplified in such a way that straight pieces are executed exclusively via a lateral movement of the working guide and curved pieces are executed exclusively by the rotation of the working optics. A combination of the lateral movement of the working guide with the rotation of the working optics is also possible, in order to make possible in this way, for example, a continuous change-over of the working process when there is a change between straight pieces and curved pieces or when there is a change between curved pieces and straight pieces.

The optics element can preferably be designed for varying the angle of the individual beam of the laser beam parts on the surface of the workpiece in the range of 0 to 90 degrees relative to the surface normal line. In this way, an angle of the individual beam which is optimally fine-tuned to the surfaces, geometries and contours to be worked can be generated. In addition, a local adaptation of the intensity can also be carried out as a function of the incident angle.

A number of advantages can be provided by the working apparatus according to the invention. In addition to the already described advantages and features, it is also possible that a rotation of one or several, preferably two, (superimposed) beam parts can be achieved, which can be both centric as well as non-centric. A one-dimensional or two-dimensional deflection of the beam relative to the laser radiation which is variable in direction can be executed by the working apparatus.

In addition, it is possible to combine a linear scan or a line focussing of the laser beam with a rotational movement by means of the working apparatus according to the invention.

In particular, it is possible with the working apparatus according to the invention to perform a radial working with centric or non-centric point of rotation. In this way, an acentricity can be adapted advantageously to the radius of a corner. This means that the path movement alone is executed by a rotational movement of the optics element.

The deflection of the beam can be embodied in different ways. For example, but not exclusively, a meandering or linear or zig-zag linear deflection of the beam can be effected.

For example, the superimposition of a two-dimensional deflection of the beam can be achieved with a rotating mirror system. Alternatively, a beam deflection or a rotation of a line focussing could be provided by two rotating linear scanners.

A rotation/linear movement of the working apparatus (thus of the laser radiation) and/or a rotation/linear movement of the workpiece to be worked, or a combination of the rotation/linear movement of the working apparatus and workpiece can be advantageously realized.

A control device, which controls the rotational movement of the optics element, can be advantageously provided. A single control device can be advantageously provided, which is responsible both for the change in orientation of the scanning direction as well as for the control of the optics element. Separate control devices are also conceivable, which then communicate with one another. In addition, at least one sensor element, by means of which the rotation can be determined, can be provided advantageously in the optics element. In this way, it is possible to provide a position feedback or acknowledgement of the angle of rotation to the scanner control, or vice versa.

Devices can be provided advantageously in order to monitor the process online. For example, means can be provided in order to generate an online process monitoring via intensity-dependent process signals (in particular, integral optical luminance of the plasma or "laser-induced breakdown spectroscopy LIBS"), i.e., in the form of a spectral analysis of the plasma lamp. Likewise, means can be provided in order to detect, advantageously online, residual contaminants and/or local surface defects and/or casting defects and/or local changes in the degree of absorption and/or the laser beam intensity on the component surface.

A continual working of radii by linear movement and rotation and adaptation of the scanning direction is made possible, in particular, by the working apparatus according to the invention.

According to another aspect of the invention, a laser working assembly is provided for working a workpiece by means of laser radiation, which is characterized by at least one laser source for generating a pulsed laser beam and a working apparatus according to the invention as described above, for the targeted deflecting and positioning of the laser beam on the workpiece.

Reference is thus made to the full extent to the above statements relative to the configuration and mode of operation of the working apparatus.

It is basically sufficient if a single laser source is utilized. Of course, two or more laser sources are also conceivable. As will be explained in more detail below in connection with the method according to the invention, it is particularly important that when a surface is pretreated for use as an adherend, that this surface is first cleaned and then subsequently remelted. This can be accomplished with different laser intensities. If a single laser source is used, it must be designed for different laser intensities, or for a laser intensity at which both cleaning and remelting can be produced. Thus, the method can be carried out in one step with only one pass. In a two-step method with a double pass, a cleaning can be undertaken first at a first intensity, and subsequently a remelting can be conducted at a second intensity. This can be realized, for example, by a laser source that is variable in intensity, or by two laser sources of different intensities.

In this way, the invention is basically not limited to specific types of laser sources. Several advantageous parameters will be described below for the laser source to be used.

Advantageously, the laser source can be designed as a pulsed laser for generating laser pulses with pulse durations in the range of 5 ns to 500 ns.

In another embodiment, the laser source can be designed for generating laser intensities of more than/equal to 5 megawatts/$cm^2$. Advantageously, the intensities may lie in the range of 5 megawatts/$cm^2$ to 500 megawatts/$cm^2$. Intensities for the cleaning process, for example, can lie in the range of 5 megawatts/cm² to 100 megawatts/cm², whereas intensities for the remelting process may lie in the range of 20 megawatts/cm² to 500 megawatts/cm². A tolerance of the intensity, e.g., with different or alternating angles of individual beams, can be equilibrated advantageously by fitted shaping of the beam.

Advantageously, the working apparatus can be designed for the generation of a pulse overlap of more than 0%, preferably between 10% and 90%, and most particularly preferred of 50%. The following phenomenon occurs in the case of pulse overlap. Laser spots with round or oval geometry usually impinge on a surface. In this way, for a good working, it is advantageous to select distances between two adjacent spots that are as small as possible. In a particularly advantageous manner, the distances will be selected so small that surface areas that are not bombarded with laser spots will no longer exist on the surface. A pulse overlap is then indicated if there is one at least partial intersecting or superimposition (overlapping) of the laser spot. The greater the percentage of overlap is, the more completely the surface can be bombarded. The pulse overlap is thus defined as follows: pulse overlap=1−pulse distance/spot diameter. Here, spot diameter is the diameter of the laser spot.

According to yet another aspect of the invention, a method is provided by means of laser radiation for working a surface of a workpiece, in particular for bonding pretreatment of a surface of a workpiece, in which laser radiation generated by means of a pulsed laser impinges on the surface to be worked, whereby contaminants found on the surface will be removed by the impinging laser radiation in a first step and whereby the layer of the workpiece near the surface will be melted in a second step by means of the impinging laser radiation and subsequently cooled again in such a way that a complete remelting of the layer near the surface occurs.

The method according to the invention involves a combined two-step method, whereby the individual steps can be executed either one after the other or simultaneously. In both steps, laser radiation is utilized in order to achieve the desired results. The first step involves a cleaning step, in which contaminants of any type will be removed from the surface by means of laser radiation. A laser beam utilized for the cleaning step preferably has an intensity of 5 megawatts/cm² to 100 megawatts/cm². The second step involves the melting and remelting work, in which the remelting of the surface occurs. A laser beam utilized for this procedure preferably has an intensity of 20 megawatts/cm² to 500 megawatts/cm². If the laser beam is found in an overlapping region of the above-named intensities, the two method steps can be conducted in a single step, for example, in a single pass. Otherwise, the method will be conducted in two steps, optionally with two passes. It would also be conceivable to conduct a single pass with two laser sources of different intensities connected one behind the other.

Advantageously, the method can be designed in such a way that both method steps will be executed within a single working step. In another embodiment, it may be provided that the two method steps will be executed within two working steps.

Preferably, laser intensities of more than/equal to 5 megawatts/cm² can be generated by the laser source.

The method according to the invention is particularly suitable for the working of a metal surface. The method according to the invention is particularly suitable for the pretreatment of adherends, in particular when these surfaces are formed of aluminum or another light metal. One reason for the creation of particularly good adherends, in which a very good stability with aging is particularly achieved by the remelting, lies in the combination of two laser processes with different parameter ranges according to the invention.

On the one hand, the surface of the workpiece can be worked by a laser, by removing contaminants and oxide layers found on the surface by means of incident laser beams. Additionally, the layer near the surface is melted and melted again, which leads to a complete remelting. Such a remelting can be carried out advantageously down to a layer depth of several tenths of a micrometer down to several 10 micrometers. This remelting, in particular, leads to an improved aging stability of the surface.

In order to achieve this, specific parameters must be selected for the laser radiation.

In addition to the already mentioned intensities, the pulse overlap forms another important parameter. It is first possible, by means of appropriately selected pulse overlap, that the surface of the workpiece can be completely remelted, which brings about the advantageous changes in the material properties that are described in further detail above. In addition, even complex contours can be worked, in particular, also in connection with a change in the running direction, since the material can be completely worked. It is advantageously provided that the laser pulses impinge on the surface to be worked with a pulse overlap of more than 0%. Reference is also made to the preceding statements for the laser working assembly relative to the pulse overlap. Advantageously, the laser pulses can impinge on the surface to be worked with a pulse overlap in the range of 10% to 90%, preferably 50%. In addition, as will be explained in more detail below, a rapid cooling rate can be of advantage.

First, there is a melting/remelting of the surface by means of the method according to the invention. In addition, a continuous transformation layer can be created by a suitable pulse overlap. A laser-induced oxide layer or a laser-induced (chemical) modification of the surface will be achieved thereby. Silicate precipitations or precipitations of alloying components as well as crystalline precipitations in general can be triggered.

Advantageously, the method can be conducted by means of a working apparatus according to the invention as described above or by means of a laser working assembly according to the invention as described above. Therefore, reference is also made to the full extent to the preceding statements relative to the working apparatus as well as to the laser working assembly for the conducting and mode of operation of the method, so that the features of the method described therein are also to be read in connection with the method according to the invention.

In particular, a direct focussing or fiber coupling and/or an advantageous homogenizing of the beam and/or an advantageous adapting of the beam geometry to the geometry of the surface to be worked will be made possible by the method according to the invention.

The laser advantageously can generate laser pulses with a pulse duration in a range between 5 ns and 500 ns.

Preferably, the layer of the workpiece near the surface will be cooled after melting at a cooling rate of 500 to 20,000 Kelvin/second. An amorphous or fine-crystalline structure can be produced particularly advantageously by the extremely short solidification times. An improvement in the surface properties, for example, the adhesive strength, the bonding stability, or the bonding-aging stability, can be effected by the changes or modifications in the crystal structure.

Even though the present invention is not limited to specific fields of application, the working apparatus according to the invention and/or the laser working assembly according to the invention and/or the method according to the invention can be used particularly advantageously for pretreating adherends, in particular, aluminum surfaces.

The invention will now be explained in more detail on the basis of embodiment examples with reference to the appended drawings. Here FIG. 1 in a perspective view and FIG. 2 in a lateral view show a working apparatus according to the invention.

Figure 1:
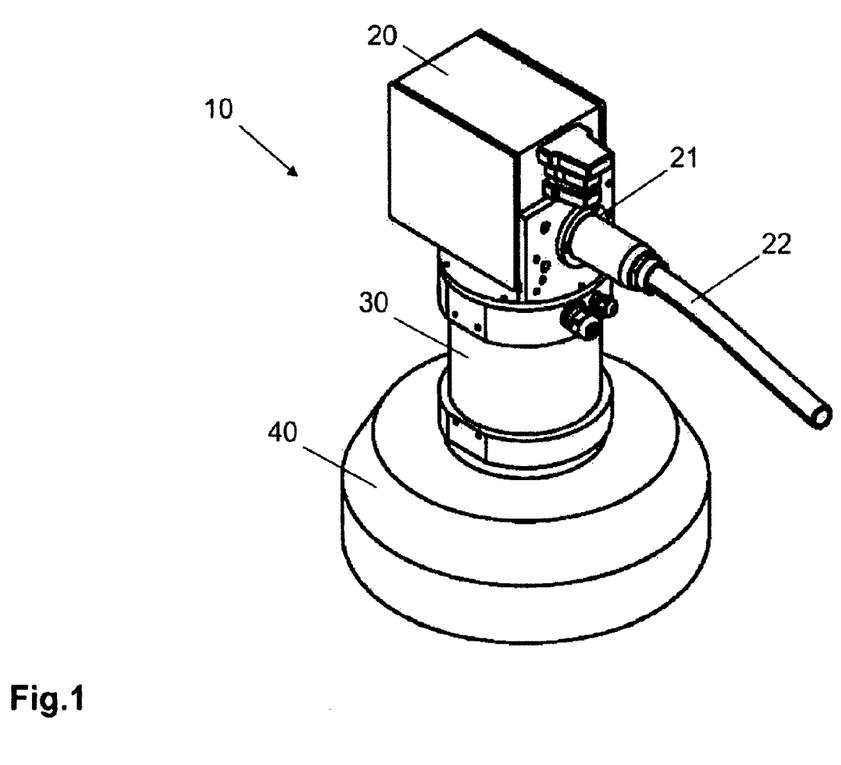
Figure 2:
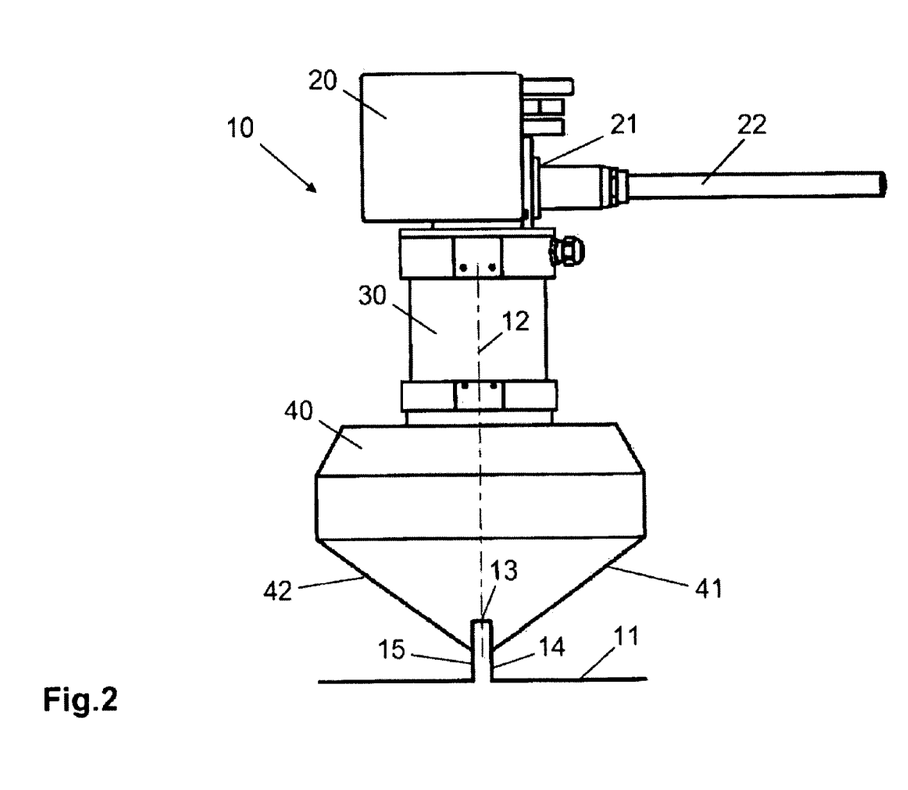

A working apparatus 10 is shown in FIGS. 1 and 2, by means of which a surface 11 of a metal workpiece, which is to be manufactured of aluminum, for example, can be worked. Working is produced in this case by means of laser radiation. In particular, joint edges of housing parts are to be cleaned by means of a laser with the working apparatus 10 and thus a bonding process can subsequently be conducted. The joint edges in this case represent the adherends. The adherends, which are circular, for example, and thus have a curved course, can be shaped as a groove or the like in one housing part, whereas they are formed as a tongue or crosspiece in the other housing part. Bonding is usually conducted in such a way that a tongue or a crosspiece is inserted into the corresponding groove. The adhesive is found in the groove or on the flanks of the tongue or the crosspiece. FIG. 2 shows a crosspiece 13 with two flanks 14, 15 on surface 11 of the workpiece, whereupon the flanks 14, are to be worked with the working apparatus 10.

In order to obtain a particularly advantageous bonding, the flanks of the tongue or the crosspiece, the burrs belonging thereto, and also the base of the groove, must be cleaned and pretreated. In order to be able to improve the adhesive strength, which is also, in particular, accompanied by an improvement in aging stability, a complete remelting of the layer near the surface must be achieved. This can be effected with the working apparatus, which is explained in more detail below.

First, the working apparatus 10 provides a scanner device 20, which has a number of connections. One of the connections involves a connection 21 for a light guide 22, which connects the scanner device 20 with a laser source, which is not shown. The scanner device 20 is rigidly mounted in the working apparatus 10, i.e., it is not movable in it; in particular, it cannot be rotated.

In order to make possible a construction along an axis 12, a motor system 30 is provided downstream to the scanner device 20. An optics element 40, which will be explained in further detail in connection with FIGS. 8 to 10, can be rotated via this motor system 30. A laser beam is split in the optics element 40 into two or more beam parts, two beam parts 41, 42, in the present example. The beam parts impinge on the surface of component 11 at a specific angle and with a specific focussing. According to FIG. 1, in this case, beam part 41 impinges on flank 14, whereas beam part 42 impinges on flank 15.

Figure 3:
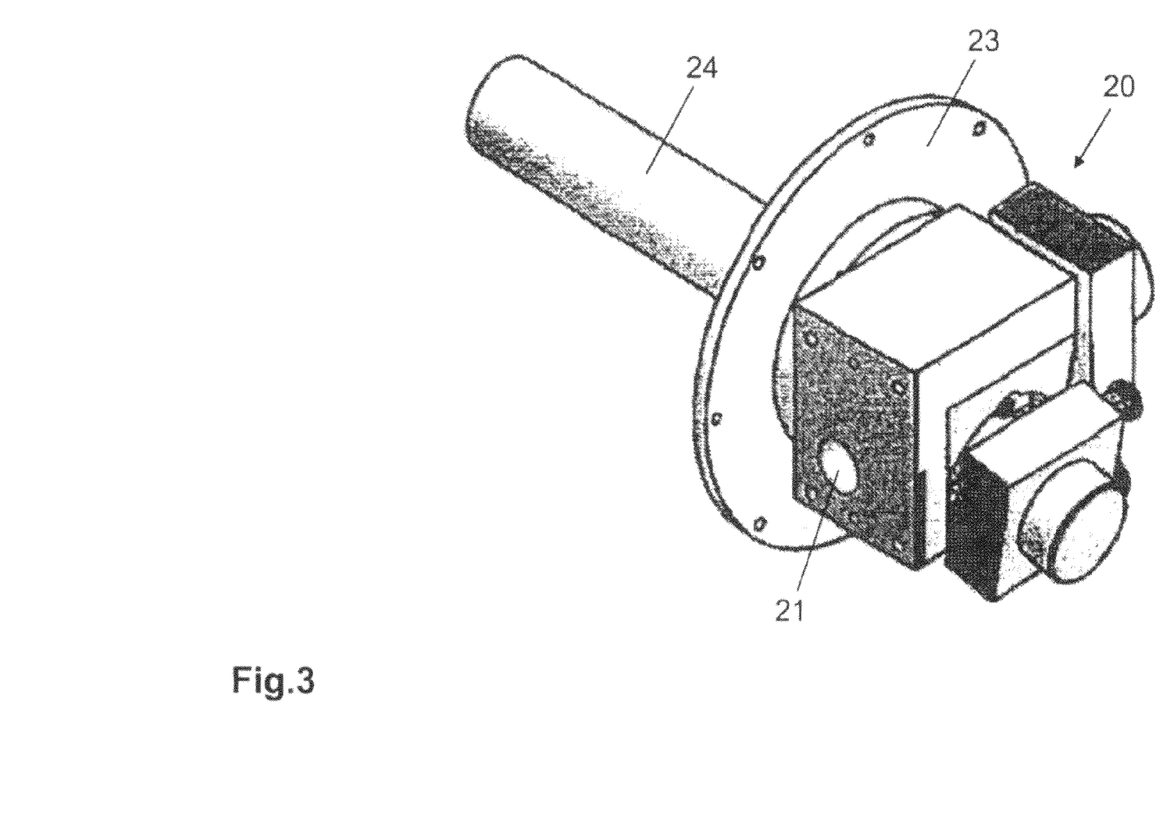
FIGS. 3 to 5 show different views of a scanner device of the working apparatus.
Figure 4:
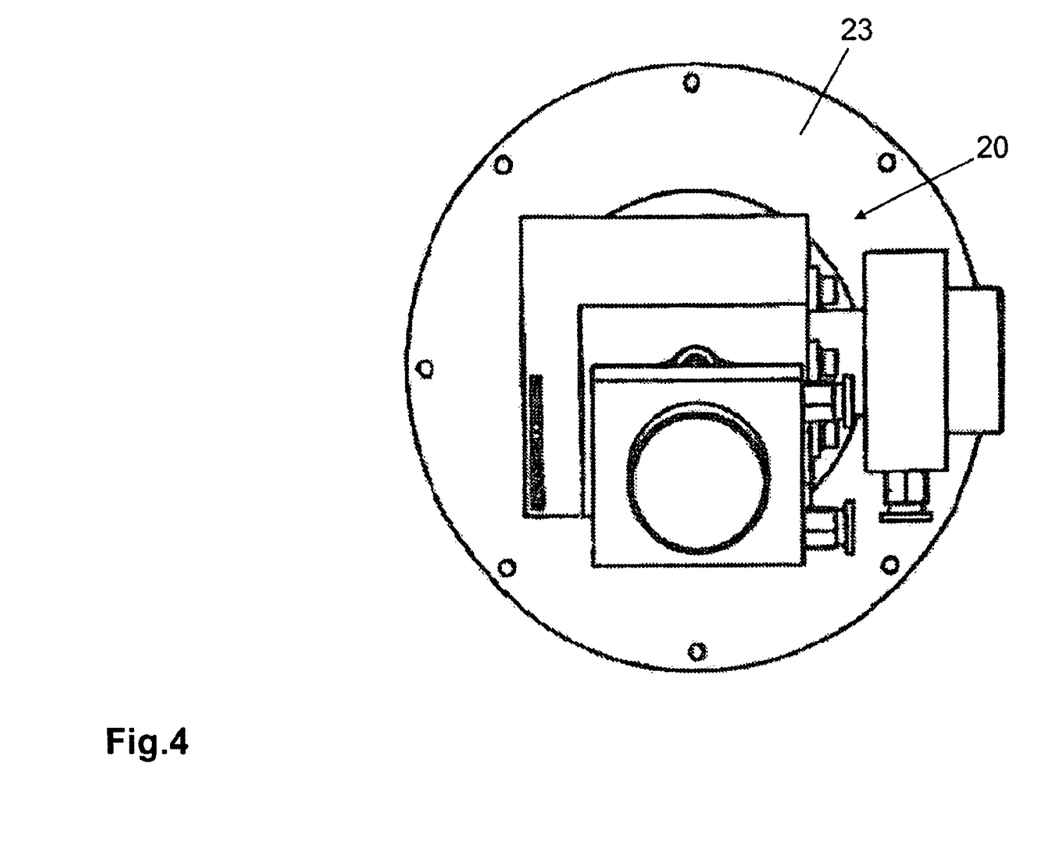
Figure 5:
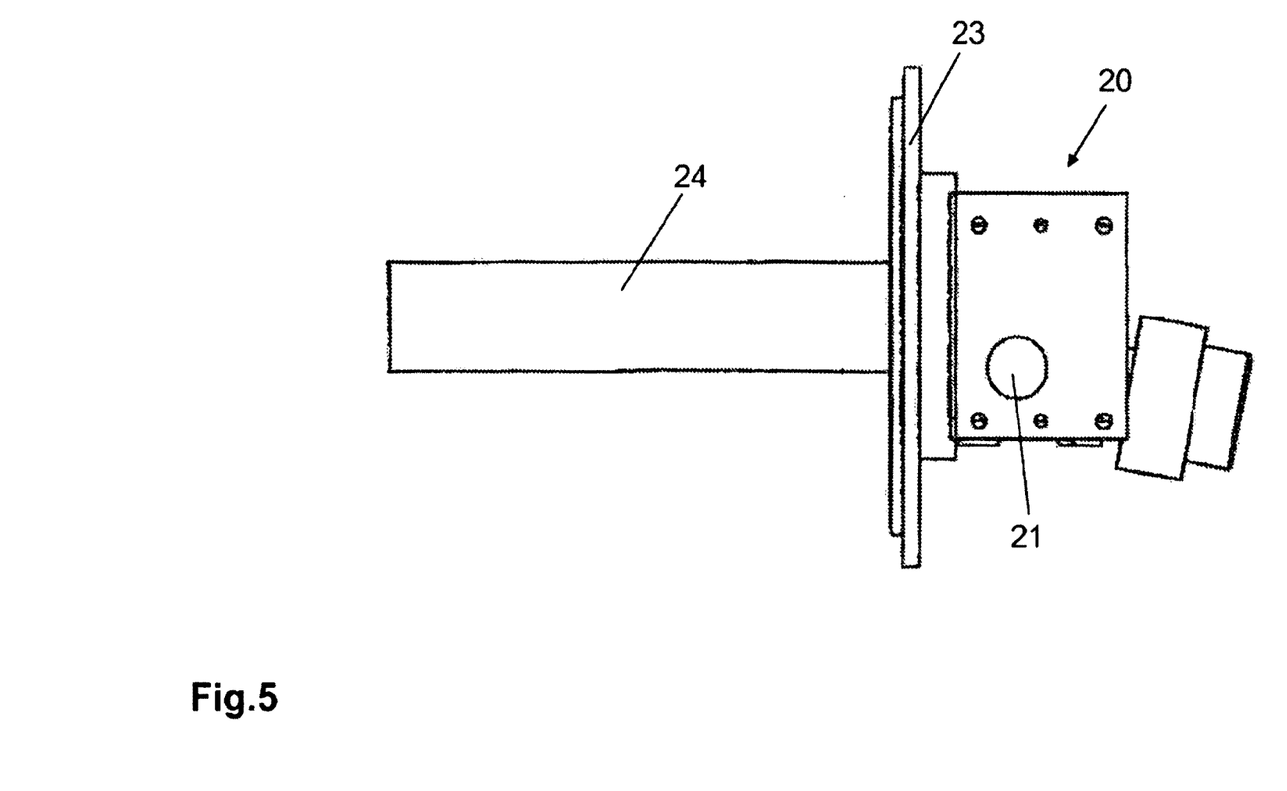

The scanner device 20 will be explained in more detail below in connection with FIGS. 3 to 5. The actual scanner device 20 serves for shaping a desired laser beam or a desired laser beam geometry. The light emitted by the laser source (not shown) enters into the scanner device 20 via the connection 21. The scanner device 20 will be rigidly mounted in the working apparatus. For this purpose, a flange 23 is provided, by means of which the scanner device 20 can be attached to a non-rotatable part of the motor system 30. The laser beam is shaped in its desired geometry in the scanner device 20 and subsequently guided further through a guiding tube 24 to the optics element 40. The guiding tube 24 serves for the purpose of guiding the laser beam through motor system 30 (see FIGS. 1 and 2), so that an interaction between the beam and the motor system 30 cannot occur.

Figure 6:
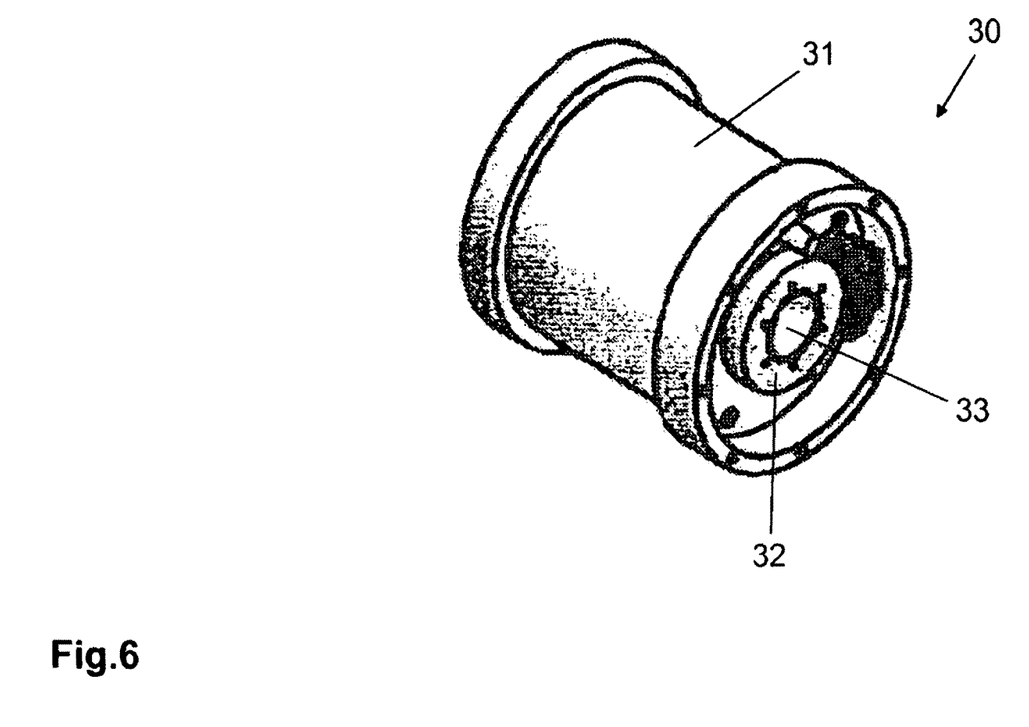
FIGS. 6 and 7 show different views of a motor system of the working apparatus.
Figure 7:
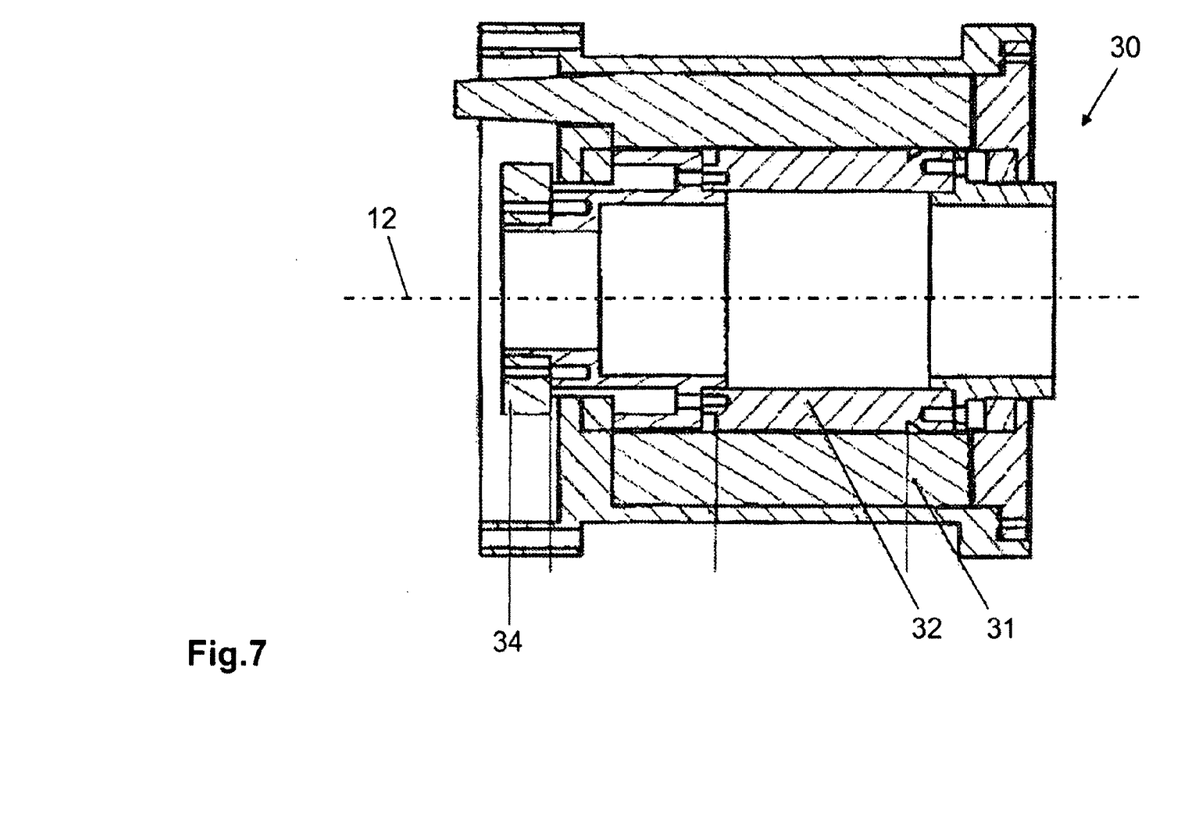

As is shown in FIGS. 6 and 7, the motor system 30 first provides a stationary outer part, the stator 31. The scanner device 20 is disposed on the stator by its flange 23. In addition, the motor system 30 provides an inner-lying rotor 32, which is connected to optics element 40 (see FIGS. 1 and 2), and the optics element 40 can be rotated by this rotor around the axis of rotation 12. A shaft encoder 34 can be provided for rotating the rotor 32. In addition, the rotor 32 has a lead-through duct 33, through which the guiding tube 24 of the scanner device 20 can be inserted (see FIGS. 3 to 5).

Figure 8:
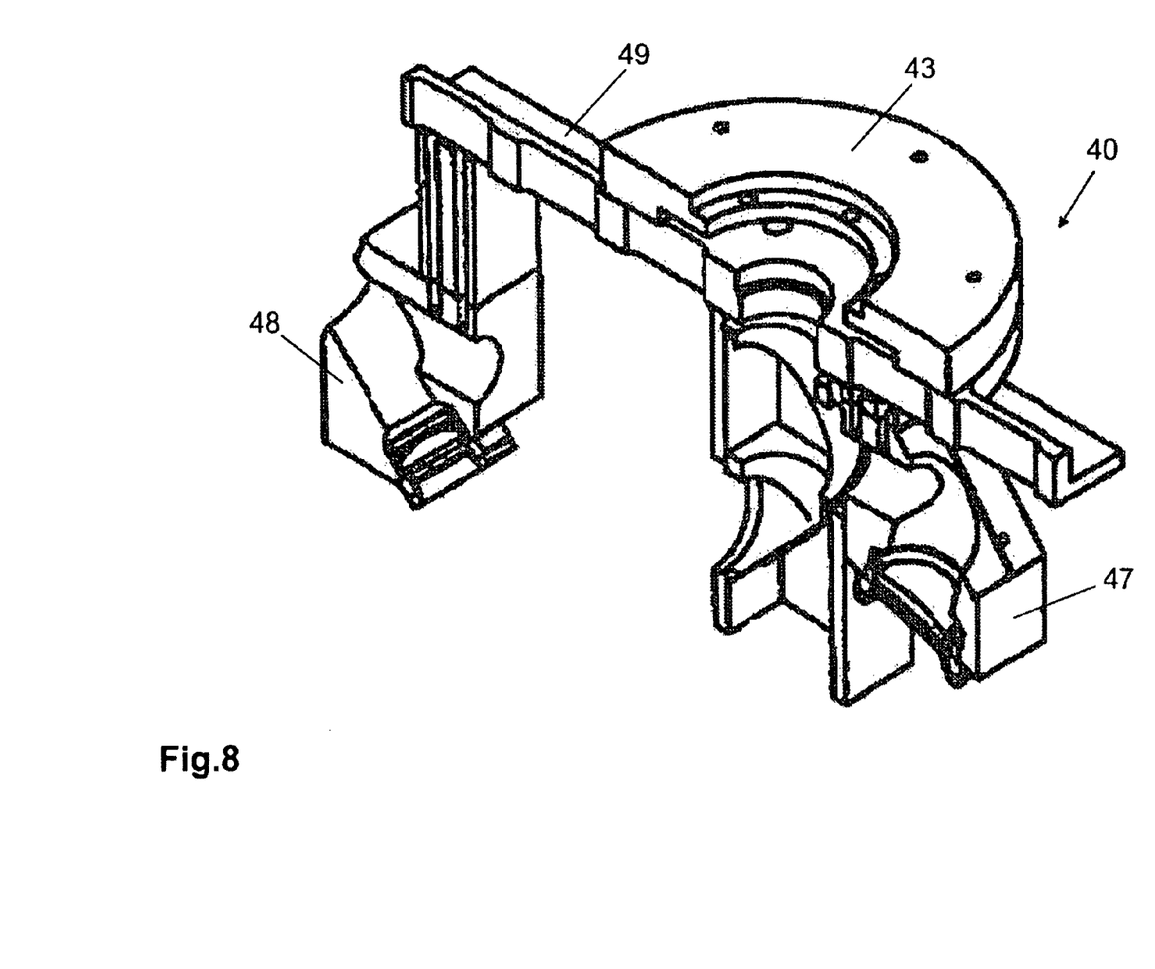
FIGS. 8 to 10 show different detail views of an optics element of the working apparatus.
Figure 9:
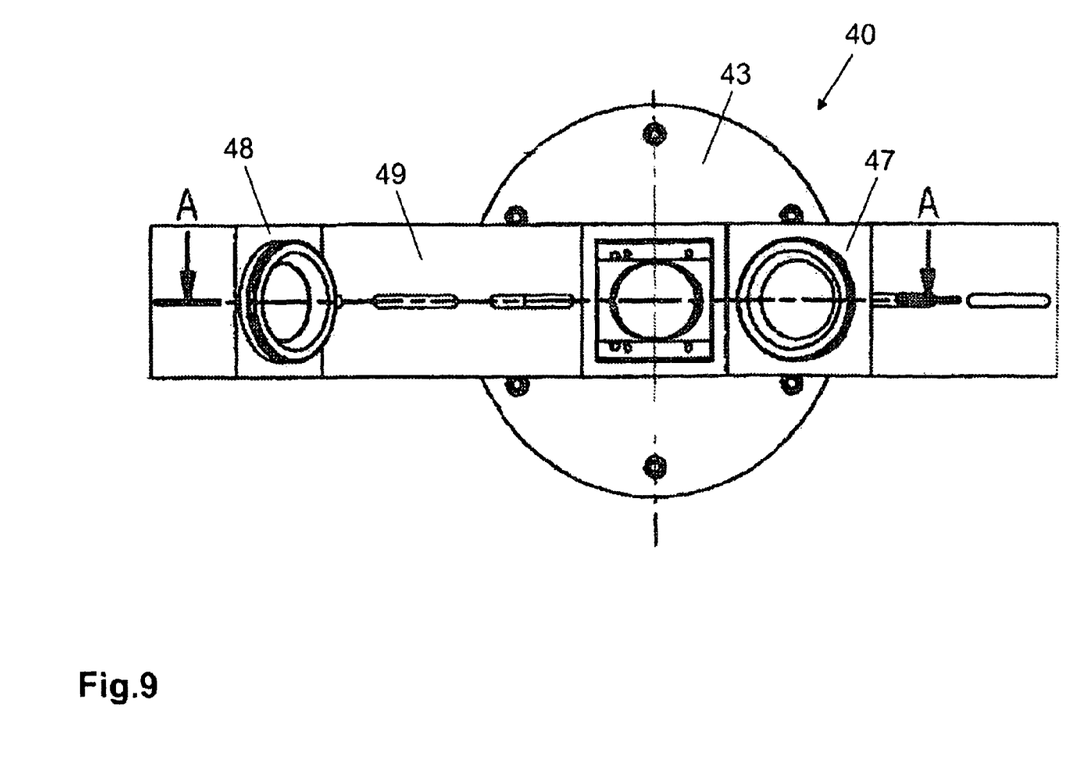
Figure 10:
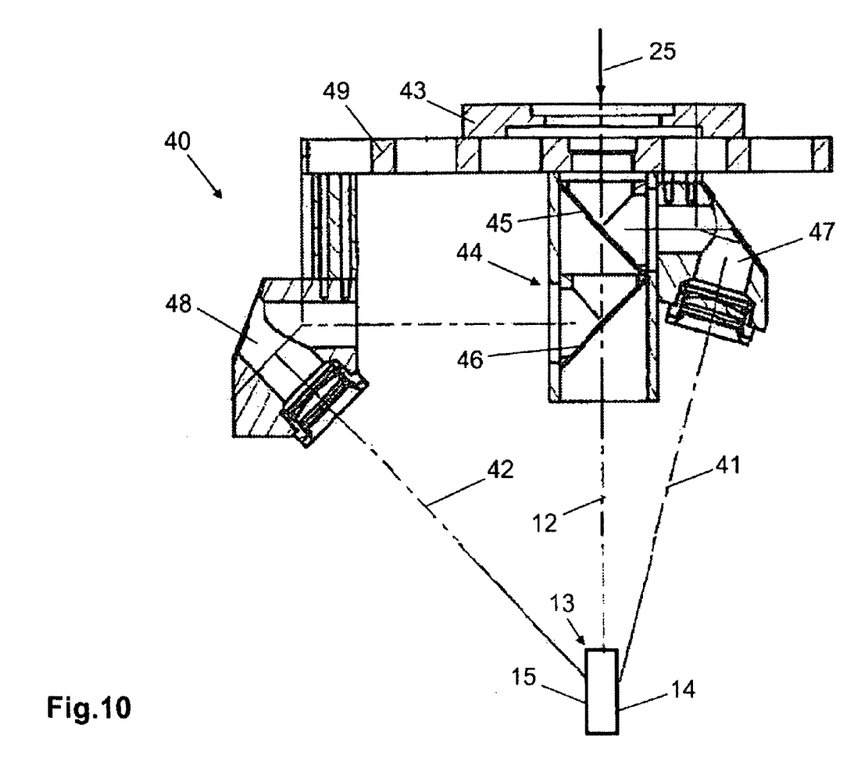

The optics element 40 is shown in greater detail in FIGS. 8 to 10. In this case, FIG. 10 shows a sectional view along the line A-A shown in FIG. 9. As can be seen from FIGS. 8 to 10, the optics element 40 first provides a flange 43, by means of which it is attached to the rotor 32 of the motor system 30 (see FIGS. 6 and 7). The optics element 40 further provides a beam splitter 44 with deflecting elements 45, 46, for example, suitable mirrors. The deflecting element 45 is advantageously designed as partially transparent, whereas the deflecting element 46 is advantageously designed as completely deflecting. A laser beam 25 leaving the scanner device 20 is split into the two beam parts 41 and 42 by the beam splitter 44. In this way, it is provided that both beam parts 41, 42 will have the same intensity, which corresponds to approximately half the beam intensity of the laser beam 25. The optics element 40 provides two radiating heads 47, 48, so that the beam parts 41, 42 can impinge on the surface to be worked, for example, crosspiece 13. These heads can be disposed at a distance from one another, which can be accomplished in the present example by means of a bracket 49. The two parts of the bracket can be designed with different lengths with respect to the axis of rotation 12.

The mode of operation of the working apparatus 10 will now be described below in more detail. Laser pulses are generated in the laser source, which is not shown, and these pulses advantageously have a pulse duration in the range between 5 ns and 500 ns. The laser intensity will be greater than/equal to 5 megawatts/cm$^2$. The laser light enters via the light guide 22 and the connection 21 into the scanner device 20, where the desired laser beam geometry will be shaped, e.g., in line form. The laser light leaves the scanner device 20 via the guiding tube 24 as the shaped laser beam 25 and subsequently enters into the optics element 40. There, it is split by the beam splitter 44 into two beam parts 41, 42, each beam part 41, 42 having an intensity of 50% of the initial laser beam 25. Whereas the scanner device 20 is mounted rigidly in the working apparatus 10, the optics element 40 can be turned, for example rotated, around the axis of rotation 12 via the motor system 30. The two beam parts 41, 42 impinge on the surface 11 of the workpiece to be worked. In the present example, each of the two beam parts 41, 42 impinge on one of the flanks 14, 15 of the crosspiece 13 to be worked, so that a working can be produced on both sides of the crosspiece 13. Since the surface is to be pretreated for a later bonding process, the two flanks 14, 15 of the crosspiece 13 will be melted and completely remelted, in fact to a layer depth of several 10ths of a micrometer to several 10 micrometers. The parameters of the laser are additionally adjusted so that the laser pulses produced have an overlap of more than 0%, preferably of 10% to 90%, and particularly preferred, of 50%. In this way, the surface can be worked in its entirety without unworked places remaining behind.

Since these types of crosspieces 13 usually have a curve-shaped course, it is necessary that the alignment of the beam parts 41, 42 that impinge on flanks 14, is also reset corresponding to the course of the curve. On the one hand, this is achieved by the rotatability of the optics element 40. Likewise, however, the scanning direction of the laser beam generated in the scanner device 20 must also be adjusted. Since the scanner device 20 is rigidly mounted in the working apparatus 10 and thus cannot be rotated, the scanner device 20 provides a control device, which is not shown in detail, by means of which the orientation of the scanning direction of the laser beam formed in scanner device 20 can be changed. This is advantageously carried out in correspondence with the rotation of the optics element 40.

Therefore, a continuous working of radii via linear movement and rotation as well as an adaptation of the scanner device will be made possible by the method.

List of Reference Numerals
10 Working apparatus
11 Workpiece surface
12 Axis/axis of rotation
13 Crosspiece
14 Flank
15 Flank
20 Scanner device
21 Connection
22 Light guide
23 Flange
24 Guiding tube
25 Laser beam
30 Motor system
31 Stator
32 Rotor
33 Lead-through duct
40 Optics element
41 Beam part
42 Beam part
43 Flange
44 Beam splitter
45 Deflecting element (partially transparent)
46 Deflecting element (completely deflecting)
47 Radiating head
48 Radiating head
49 Bracket

The invention claimed is:

1. An apparatus for the working of a surface of a workpiece, in particular a metal workpiece, by means of laser radiation, characterized by a scanner device mounted in a rotationally immovable manner in the working apparatus as well as an optics element movable around an axis of rotation, whereby a laser beam that is to be deflected and positioned on the surface to be worked can be shaped with a defined laser beam geometry by means of the optics element, the optics element being arranged downstream of the scanner device in the beaming direction of the laser beam, and a control apparatus for changing the orientation of the scanning direction for the beam deflection of the laser beam in correspondence with the rotation of the optics element.

2. The working apparatus according to claim 1, further characterized in that the optics element has a beam splitter device for splitting the laser beam into two or more beam parts, in particular, into beam parts of equal intensity, and for deflecting and positioning the beam parts on the surface to be worked.

3. The working apparatus according to claim 1, further characterized in that it has a motor system for moving the optics element, that the motor system in particular has a stator, which is connected to the scanner device, and that the motor system, in particular, has a rotor, which is connected to optics element.

4. The working apparatus according to claim 2, further characterized in that the optics element has radiating heads, which are distanced from one another, for irradiating and positioning the beam parts on the workpiece surface.

5. The working apparatus according to claim 2, further characterized in that the focus position of the beam parts is variably adjustable relative to the point of intersection of the beam parts.

6. The working apparatus according to claim 2, further characterized in that the beam parts are aligned in such a way that their point of intersection lies in the axis of rotation of the optics element.

7. The working apparatus according to claim 2, further characterized in that the optics element is designed for centric or non-centric superimposition of the beam parts.

8. The working apparatus according to claim 2, further characterized in that the optics element is designed for varying the angle of the individual beams of the laser beam parts on the workpiece surface in the range of 0 to 90 degrees relative to the surface normal line.

9. A laser working assembly for working a workpiece by means of laser radiation, characterized by at least one laser source for generating a pulsed laser beam and a working apparatus according to claim 1 for the targeted deflecting and positioning of the laser beam on the workpiece.

10. The laser working assembly according to claim 9, further characterized in that the laser source is designed as a pulsed laser for generating laser pulses with pulse durations in the range of 5 ns to 500 ns.

11. The laser working assembly according to claim 9, further characterized in that the laser source is designed for generating laser intensities of greater than/equal to 5 megawatts/cm$^2$.

12. The laser working assembly according to claim 9, further characterized in that the working apparatus is designed for generating a pulse overlap of greater than 0%.

13. A method for the working of a surface of a workpiece, in particular for bonding pretreatment of a surface of a workpiece, by means of laser radiation, whereby the method is conducted, in particular, by means of a working apparatus for the working of a surface of a workpiece, in particular a metal workpiece, by means of laser radiation, characterized by a scanner device mounted in a rotationally immovable manner in the working apparatus as well as an optics element movable around an axis of rotation, whereby a laser beam that is to be deflected and positioned on the surface to be worked can be shaped with a defined laser beam geometry by means of the optics element, the optics element being arranged downstream of the scanner device in the beaming direction of the laser beam, and a control apparatus for changing the orientation of the scanning direction for the beam deflection of the laser beam in correspondence with the rotation of the optics element or a laser working assembly according to claim 9, hereby characterized in that laser radiation generated by means of a pulsed laser impinges on the surface to be worked, that contaminants found on the surface will be removed in a first step, and that in a second step, the layer of the workpiece near the surface will be melted and subsequently cooled again in such a way that a complete remelting of the layer near the surface takes place.

14. The method according to claim 13, further characterized in that the layer of the workpiece near the surface will be cooled after melting at a cooling rate of 500 to 20,000 Kelvin/second.

15. Use of a working apparatus according to claim 1 or a laser working assembly according to claim 9 or of a method according to claim 13 for the pretreatment of adherends.

* * * * *